Dec. 17, 1940.  W. W. LANDRUM  2,225,224
CUTTING TOOL
Filed March 15, 1938  2 Sheets-Sheet 1

Inventor
William H. Landrum

By Edward V. Hardware
Attorney

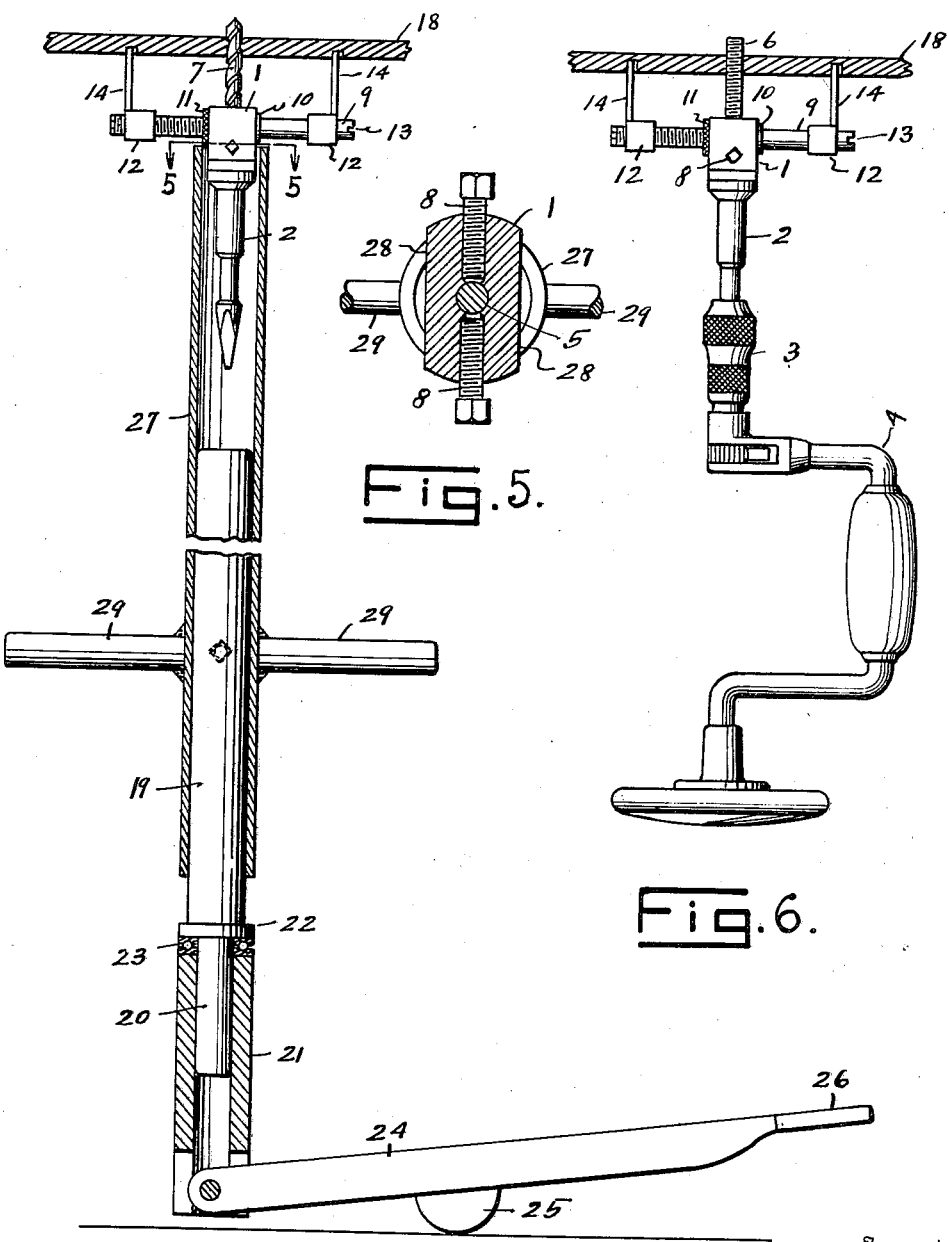

Patented Dec. 17, 1940

2,225,224

UNITED STATES PATENT OFFICE 2,225,224

CUTTING TOOL

William W. Landrum, League City, Tex.

Application March 15, 1938, Serial No. 196,016

3 Claims. (Cl. 145—121)

This invention relates to a cutting tool and has particular relation to a tool for cutting openings in walls or ceilings for outlet boxes for electrical wiring.

While primarily intended for cutting such openings as above referred to the tool is applicable generally for cutting circular openings.

An object of the invention is to provide a cutter of the character described embodying a cutter head and cutter blades mounted thereon with means for adjusting the blades to cut openings of different diameters.

It is another object of the invention to provide in a device of the character described a novel type of cutter blade.

It is a further object of the invention to provide novel means for adjusting the blade cross-heads and blades relative to the cutter head.

A further object of the invention is to provide novel means for feeding the cutter to the work.

With the above and other objects in view the invention has particular relation to certain novel features of construction, operation and arrangement of parts, examples of which are given in this specification and illustrated in the accompanying drawings, wherein:

Figure 4 shows another embodiment of the cutter showing novel means for applying the same to the work.

Figure 5 shows an enlarged cross-sectional view taken on the line 5—5 of Figure 4, and Figure 6 shows a side view of the type of cutter illustrated in Figure 1 as applied to the work.

Figure 2:
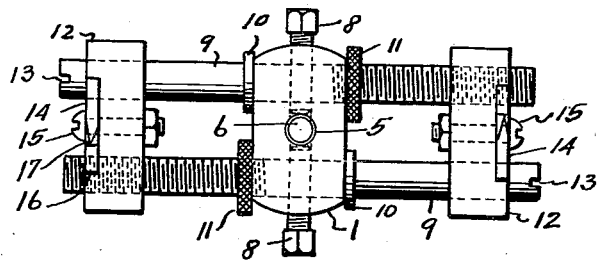
Figure 2 shows a plan view.
Figure 3:
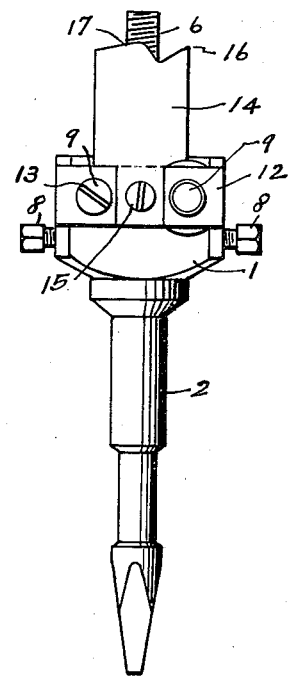
Figure 3 shows a side elevation taken at right angles to the form shown in Figure 1.
Figure 1:
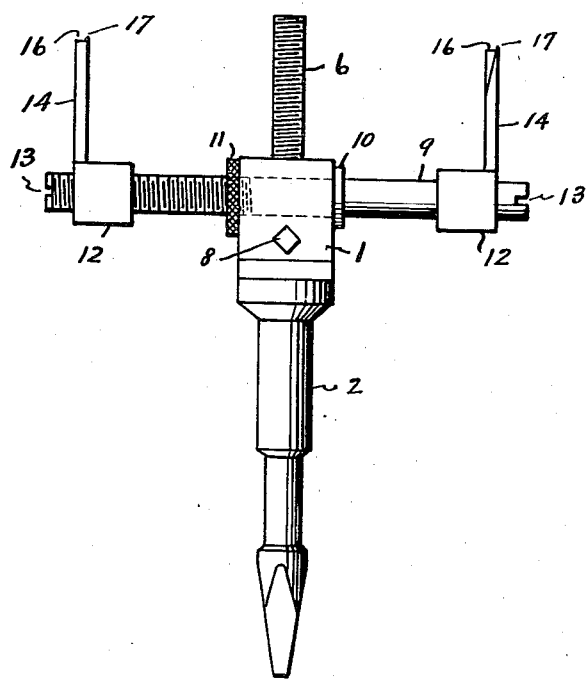
Figure 1 shows a side view of the cutter.

In the drawings the numeral 1 designates the cutter head which has an extended shank 2 whose outer end is shaped to fit into the chuck 3 of the brace 4. Opposite the shank the head 1 has an axial socket 5 to receive the shank of the outwardly threaded feed rod 6 as shown in Figures 1, 2, 3, and 6, or to receive the shank of the pilot drill 7 as shown in Figure 4. Threaded into opposite ends of the head are the clamp bolts 8, 8 whose inner ends clamp against the shank in the socket 5 to securely clamp the same in said socket.

Adjusting rods 9, 9 are arranged in parallel relation and are fitted through bearings in the head 1. These rods are rotatable in said bearings and are held against endwise movement therein by the ribs 10, 10 on the rods which abut the head and by the nuts 11, 11 threaded onto the rods on the opposite side of the head from the corresponding ribs 10. The rods 9 may, therefore, turn in the head bearings but are maintained against longitudinal movement relative to the head. Mounted on the rods 9 on opposite sides of the head 1 are the cutter cross-heads 12, 12. Each cross-head has a smooth bore or bearing and an internally threaded bearing and the corresponding ends of the rods 9 are formed one smooth to fit through the smooth bearing in the corresponding cross-head 12 and the other is threaded through the threaded bearing of said cross-head. Each rod 9 has a transverse groove 13 at one end to receive the blade of a screwdriver whereby said rod may be turned. Upon turning one rod the blade cross-head 12 connected with the threaded end thereof may be adjusted radially and upon turning the other rod the other blade cross-head 12 may also be adjusted so that said cross-heads 12 may be independently adjusted on the rods 9. Outstanding from each blade cross-head and in parallel relation with the axis of the shank 2 there is a cutter blade 14. These cutter blades are countersunk into the outer sides of the cross-heads 12 and secured thereto in any preferable manner as by clamp bolts 15. Each blade 14 is formed with a transverse scraping edge 16 and behind it cutting edge 17 elevated slightly above the scraping edge 16 as shown more clearly in Figure 1.

As shown in this last mentioned figure the cutting edges 17 are arranged one at the outer side of the blade 14 and the other at the inner side of said blade 14 so that when the blades 14 are adjusted the same distance from the axis of the shank 2 they will cut in concentric circles spaced the required distance apart so that the scraping edges 16 will move between said circles and remove the material between them.

In application to the work if the form shown in Figure 6 is employed a small auger should first be used to form a bore through the wall 18 and the bolt 6 may then be screwed through the hole made by the auger and is of sufficient size to cause the threads of the bolt 6 to engage the material so as to feed the cutters to the work as illustrated in Figure 6 and upon operation of the brace 4 in the usual way the cutters will be gradually fed to the work until the desired opening is cut through the wall.

For overhead work the cutter is applied to the work by means of a driving implement which will now be described: This implement embodies a cylindrical mandrel 19 forming a guide whose lower end is formed into a reduced spindle 20 which works in an upstanding tubular support 21. The guide has an annular rib 22 thereon which is supported on the anti-friction bearings 23 between it and the upper end of the support 21. The lower end of the support 21 is pivoted to one end of the supporting lever 24 which has a depending fulcrum 25 to rest on the supporting surface and the other end of the lever is provided with a pedal 26 which may be depressed operating on the fulcrum 25 to elevate the support 21 and the guide 19.

Fitted over the upper end of the mandrel 19 there is a tubular driving shaft 27 whose upper end is formed with the oppositely disposed notches 28 to receive, and form a driving connection with, the head 1 as shown in Figure 4. The tubular driving shaft 27 is provided with the radial handles 29 for turning the same. The driving shaft is adjustable on the guide 19 and may be clamped thereto by the clamp bolt 30. In application to the work the apparatus may be assembled as shown in Figure 4 and the pedal 26 depressed thus elevating the support 21 and bringing the pilot bit into contact with the ceiling 18 and the shaft 27 may then be turned by the handles 29 causing the pilot bit to penetrate the ceiling 18 and feed the cutters 14 to the work and this turning movement may be continued until the opening is cut through.

In applying the cutter to ceilings that are papered and canvased without tearing the same this may be accomplished by rotating the cutters in a reverse direction. As the cutting edges 17 come into contact with the paper they will make a smooth cut through the paper, the thin edges 17 not being so liable to tear the paper or canvas but being shaped to make a clean cut therethrough.

The drawings and description disclose what are now considered to be preferred forms of the invention by way of illustration only, while the broad principle of the invention will be defined by the appended claims.

What I claim is:

1. A cutter comprising a cutter head, approximately parallel rods extending through the head and having a swiveling connection therewith, cross-heads on the rods on opposite sides of the head, cutter blades on the cross-heads, each rod having a threaded connection with one of said cross-heads and a sliding connection with the other of said cross-heads.

2. A cutter of the character described comprising a cutter head having parallel bearings, transverse rods rotatable in said bearings but confined against endwise movement therein, blade cross-heads on the rods on opposite sides of the cutter head, blades on the cross-heads, each cross-head having a threaded connection with one rod and a sliding connection with the other rod and means on the cutter head for feeding the cutters to the work.

3. A cutter comprising a cutter head having a drive shank, transverse rods rotatably mounted on the cutter head, means for confining said rods against longitudinal movement relative to the head, cutter cross-heads mounted on the rods on opposite sides of the cutter head, each cross-head having a threaded connection with one rod and a sliding connection with the other rod, cutter blades on the cross-heads arranged parallel with the axis of the shank.

WILLIAM W. LANDRUM.